(12) United States Patent
Jung et al.

(10) Patent No.: US 7,656,078 B2
(45) Date of Patent: Feb. 2, 2010

(54) LIGHT EMISSION DEVICE INCLUDING A HEAT DISSIPATION PLATE AND A THERMAL DIFFUSER PLATE

(75) Inventors: Kyu-Won Jung, Yongin-si (KR); Sang-Jin Lee, Yongin-si (KR); Su-Joung Kang, Yongin-si (KR); Jin-Ho Lee, Yongin-si (KR); Pil-Goo Jun, Yongin-si (KR); Kyung-Sun Ryu, Yongin-si (KR); Jong-Hoon Shin, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 248 days.

(21) Appl. No.: 11/696,141

(22) Filed: Apr. 3, 2007

(65) Prior Publication Data
US 2007/0291019 A1 Dec. 20, 2007

(30) Foreign Application Priority Data
Jun. 20, 2006 (KR) .................. 10-2006-0055456

(51) Int. Cl.
*H01J 61/52* (2006.01)
*H01J 7/24* (2006.01)
(52) U.S. Cl. ..................... 313/44; 313/46; 313/495
(58) Field of Classification Search ......... 313/497–498, 313/11–46
See application file for complete search history.

(56) References Cited

U.S. PATENT DOCUMENTS 5,757,443 A 5/1998 Kobayashi
5,971,566 A * 10/1999 Tani et al. .................. 362/294
6,031,328 A * 2/2000 Nakamoto .................. 313/495
2002/0125803 A1* 9/2002 Seki ........................... 313/47

(Continued)

FOREIGN PATENT DOCUMENTS

CN 1510709 A 7/2004

(Continued)

OTHER PUBLICATIONS

European Search Report dated Jan. 14, 2008 for corresponding European Patent Application No. 07110620.7, indicating the relevance of the cited references.

(Continued)

*Primary Examiner*—Mariceli Santiago
(74) *Attorney, Agent, or Firm*—Christie, Parker & Hale, LLP

(57) ABSTRACT

A light emission device and a display device using the light emission device as a light source are provided. The light emission device includes first and second substrates facing each other, an electron emission unit located on an inner surface of the first substrate, a phosphor layer located on an inner surface of the second substrate and adapted to be excited by electrons emitted from the electron emission unit, an anode electrode located on the phosphor layer, a heat dissipation plate located at a side of the first substrate, and a thermal diffuser plate located on the second substrate and thermally coupled to the heat dissipation plate. The thermal diffuser plate is configured to transmit light emitted by the phosphor layer.

20 Claims, 7 Drawing Sheets

U.S. PATENT DOCUMENTS

2007/0097285 A1*  5/2007  Choi .......................... 349/58
2008/0252192 A1* 10/2008  Kim et al. ..................... 313/45

FOREIGN PATENT DOCUMENTS

| EP | 0 550 047 A2 | 7/1993 |
| EP | 1 519 217 A1 | 3/2005 |
| EP | 1 858 057 A2 | 11/2007 |
| JP | 7-335015 | 12/1995 |
| JP | 2005-302556 | 10/2005 |
| KR | 10-2006-0001410 | 1/2006 |
| KR | 10-2006-0012405 | 2/2006 |

OTHER PUBLICATIONS

Patent Abstracts of Japan, Publication No. 07-335015, dated Dec. 22, 1995, in the name of Toshihiro Yamaguchi et al.

Patent Abstracts of Japan, Publication No. 2005-302556, dated Oct. 27, 2005, in the name of Takeshi Ito et al.

Korean Patent Abstracts, Publication No. 1020060001410 A, dated Jan. 6, 2006, in the name of Seung Hyun Son et al.

Korean Patent Abstracts, Publication No. 1020060012405 A, dated Feb. 8, 2006, in the name of Jae Myung Kim.

* cited by examiner

LIGHT EMISSION DEVICE INCLUDING A HEAT DISSIPATION PLATE AND A THERMAL DIFFUSER PLATE

CROSS-REFERENCE TO RELATED APPLICATION

This application claims priority to and the benefit of Korean Patent Application No. 10-2006-0055456 filed on Jun. 20, 2006 in the Korean Intellectual Property Office, the entire content of which is incorporated herein by reference.

BACKGROUND OF THE INVENTION

1. Field of the Invention

The present invention relates to a light emission device and a display device using the light emission device as a light source.

2. Description of Related Art

A liquid crystal display (LCD), which is a flat panel display device, displays an image by varying a light transmission amount at each pixel using a dielectric anisotropy property of liquid crystal that varies in a twisting angle according to a voltage applied.

The liquid crystal display includes a liquid crystal (LC) panel assembly and a backlight unit for emitting light toward the liquid crystal panel assembly. The liquid crystal panel assembly receives light emitted from the backlight unit and selectively transmits or blocks the light using a liquid crystal layer.

The backlight unit is classified according to a light source into different types, one of which is a cold cathode fluorescent lamp (CCFL). The CCFL is a linear light source that can uniformly emit light to the liquid crystal panel assembly through an optical member such as a diffusion sheet, a diffuser plate, and/or a prism sheet.

However, in the backlight unit employing the CCFL, since the CCFL emits the light through the optical members, there may be a light loss. Considering the light loss, the intensity of the light emitted from the CCFL must be increased. Therefore, the power consumption of the backlight unit employing the CCFL increases. In addition, since the backlight unit employing the CCFL cannot be large-sized due to its structural limitation, it cannot be applied to a large-sized liquid crystal display over 30-inch.

A backlight unit employing light emitting diodes (LEDs) is also well known. The LEDs are point light sources that are combined with optical members such as a reflection sheet, a light guiding plate (LGP), a diffusion sheet, a diffuser plate, a prism sheet, and/or the like, thereby forming the backlight unit. The LED type backlight unit has fast response speed and good color reproduction. However, the LED is costly and increases an overall thickness of the liquid crystal display.

As described above, the conventional backlight units have their inherent problems. In addition, the conventional backlight units must maintain a predetermined brightness when the liquid crystal display is being driven. Therefore, it is difficult to improve the display quality to a sufficient level.

SUMMARY OF THE INVENTION

In exemplary embodiments according to the present invention, a light emission device that can effectively dissipate heat generated from a substrate on which a light emission unit is disposed, is provided. Such light emission device can be used as a backlight unit.

In exemplary embodiments according to the present invention, a display device that can improve a display quality by enhancing the dynamic contrast by employing the light emission device as a light source, is also provided. The display device may be a liquid crystal display, and the light source may be a backlight unit for the liquid crystal display.

According to an exemplary embodiment of the present invention, a light emission device is provided. The light emission device includes a first substrate having a first side and a second side opposite the first side; a second substrate having a first side and a second side opposite the first side, the first sides of the first and second substrates facing each other; an electron emission unit located on the first side of the first substrate; a phosphor layer located on the first side of the second substrate and adapted to be excited by electrons emitted from the electron emission unit; an anode electrode located on the phosphor layer; a heat dissipation plate located at the second side of the first substrate; and a thermal diffuser plate located on the second substrate and thermally coupled to the heat dissipation plate, the thermal diffuser plate being configured to transmit light emitted by the phosphor layer.

The thermal diffuser plate may extend to the first substrate and the heat dissipation plate may be located on an outer surface of the thermal diffuser plate at the first substrate.

The thermal diffuser plate may have a light transmissivity of at least 80%.

The thermal diffuser plate may be transparent.

The thermal diffuser plate may be formed of a ceramic material.

The ceramic material may include at least one of aluminum oxide or titanium oxide.

The heat dissipation plate may include a material selected from the group consisting of Al, Ag, Cu, Au, Pt, and an alloy thereof.

The heat dissipation plate may include a base and a plurality of heat dissipation fins located on the base and spaced apart from each other.

The heat dissipation plate may be thermally coupled to a circuit unit to dissipate heat generated from the circuit unit.

The electron emission unit may include a cathode electrode and a gate electrode insulated from each other and crossing each other, and electron emission regions electrically connected to the cathode electrode.

The electron emission regions may include at least one of a carbon-based material or a nanometer-sized material.

In another exemplary embodiment, a display device is provided. The display device includes a display panel having a plurality of pixels arranged in rows and columns; and a light emission device disposed behind the display panel and configured to function as a light source for the display device. The light emission device includes: a first substrate having a first side and a second side opposite the first side; a second substrate having a first side and a second side opposite the first side, the first sides of the first and second substrates facing each other; an electron emission unit located on the first side of the first substrate; a phosphor layer located on the first side of the second substrate and adapted to be excited by electrons emitted from the electron emission unit; an anode electrode located on the phosphor layer; a heat dissipation plate located at the second side of the first substrate; and a thermal diffuser plate located on the second substrate and thermally coupled to the heat dissipation plate, the thermal diffuser plate being configured to transmit light emitted by the phosphor layer.

The thermal diffuser plate may be formed of a ceramic material.

The light emission device may have a plurality of pixels arranged in rows and columns, the number of the pixels of the light emission device being less than that of the pixels of the liquid crystal panel assembly and the pixels of the light emission device are adapted to emit lights having different light intensities.

The light emission device may be adapted to represent a gray of 2-8 bits for each pixel.

The phosphor layer may be a white phosphor layer or may include red, green and blue phosphor layers.

BRIEF DESCRIPTION OF THE DRAWINGS

A more complete appreciation of embodiments of the present invention and many of the features thereof, will be readily apparent as the embodiments of the present invention become better understood by reference to the following detailed description when considered in conjunction with the accompanying drawings in which like reference symbols indicate like components, wherein.

DETAILED DESCRIPTION

Figure 1:
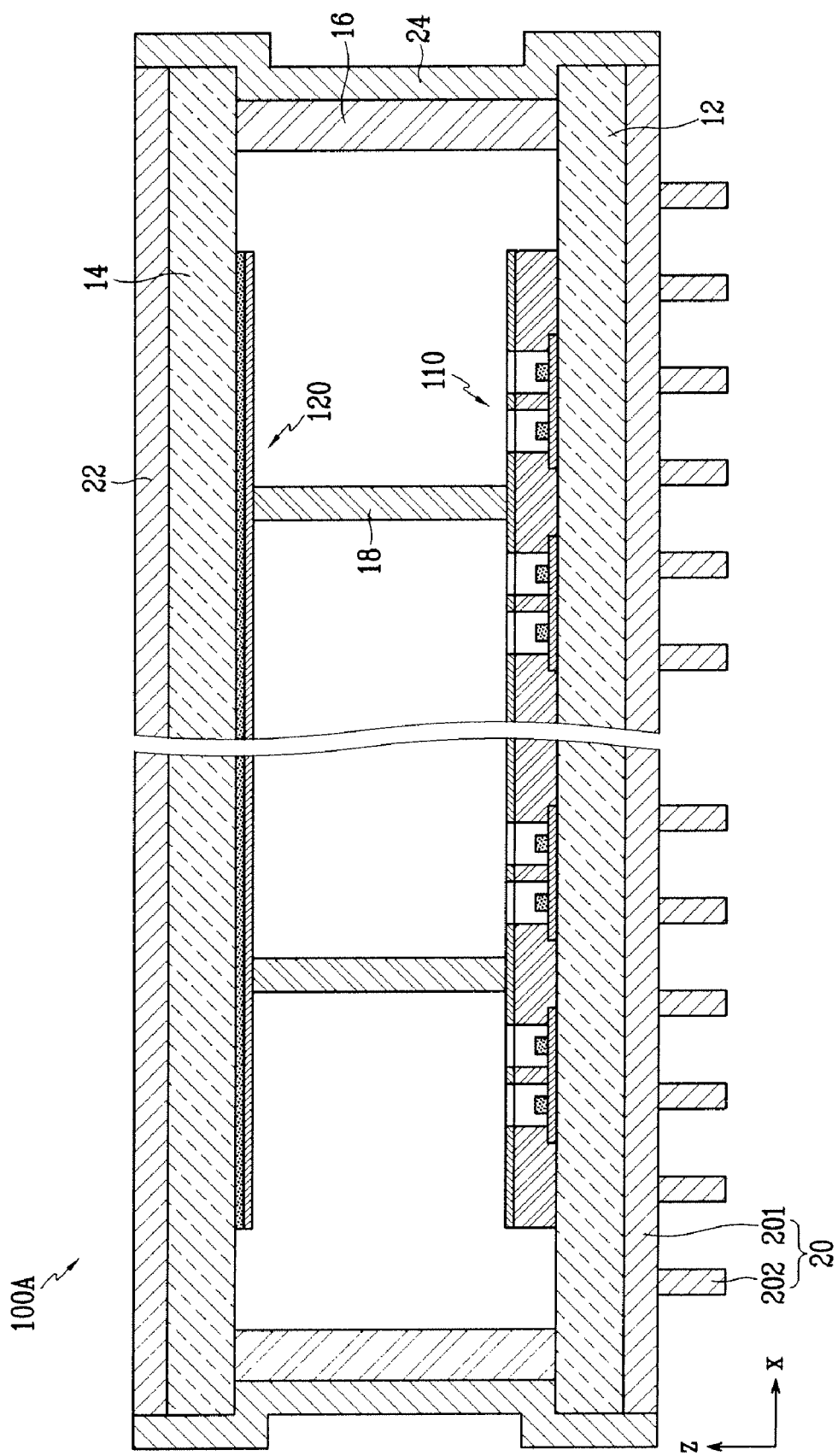
FIG. 1 is a sectional view of a light emission device according to an embodiment of the present invention.

When a liquid crystal panel assembly is used to display an image having a bright portion and a dark portion in response to an image signal, it will be possible to realize an image having a more improved dynamic contrast if the backlight unit can emit lights having different intensities to pixels for the dark portion and pixels for the bright portion of the liquid crystal panel assembly. Similarly, the dynamic contrast can be improved for any display device having a separate light source, if the light source can emit lights having different intensities to dark and bright portions of a display panel (e.g., non-self emissive type display panel) in the display device.

However, conventional backlight units cannot achieve the above function and thus there is a limit to improving the dynamic contrast of the image displayed by the liquid crystal display.

In exemplary embodiments according to the present invention, a field emission display (FED) that is capable of displaying an image using an electron emission property in response to an electric field, is used as the backlight unit of the liquid crystal display.

A typical field emission display includes a vacuum envelope having front and rear substrates and a sealing member, an electron emission unit provided on the first substrate and having electron emission regions and driving electrodes, and a light emission unit provided on the second substrate and having a phosphor layer and an anode electrode.

The electron emission regions emit electrons in response to driving signals. The anode electrode receives a positive DC voltage of thousands of volts to accelerate the electrons to the phosphor layers, thereby exciting the phosphor layers of target pixels.

In order to use the FED as the backlight unit, in one embodiment, a higher positive voltage is applied to the anode electrode to increase the brightness compared with a case where the FED is used as a display device. That is, the backlight unit must provide a brightness higher than 10,000 cd/m$^2$. Therefore, when the FED is used as the backlight unit, a relatively large amount of heat is generated in the FED. When the generated heat is not dissipated to an external side but accumulated in the FED, the substrates may be damaged and the driving error may occur.

In order to dissipate the heat generated from a circuit unit arranged on the rear substrate, a cooling fan or a heat dissipation plate is typically installed near the rear substrate. However, the heat generated from the front substrate is generally not effectively dissipated.

Exemplary embodiments of the present invention will now be described more fully with reference to the accompanying drawings, in which exemplary embodiments of the present invention are shown. The present invention may, however, be embodied in many different forms and should not be construed as being limited to the embodiments set forth herein; rather these embodiments are provided so that this disclosure will be thorough and complete, and will fully convey the concept of the invention to those skilled in the art.

FIG. 1 is a sectional view of a light emission device according to an embodiment of the present invention.

Referring to FIG. 1, a light emission device 100A of this exemplary embodiment includes first and second substrates 12 and 14 facing each other with a distance or interval (e.g., a predetermined distance) between them. A sealing member (or sealer) 16 is provided at the peripheries of the first and second substrates 12 and 14 to seal them together and thus form a vacuum envelope. The interior of the sealed vessel is exhausted to be kept to a degree of vacuum of about $10^{-6}$ Torr.

An electron emission unit 110 for emitting electrons is provided on an inner surface of the first substrate 12, and a light emission unit 120 for emitting the visible light is provided on an inner surface of the second substrate 14. Spacers 18 are arranged between the electron emission unit 110 and the light emission unit 120 to maintain a gap (e.g., a predetermined gap) between the first and second substrates 12 and 14.

A heat dissipation plate 20 is formed on the first substrate 12. A thermal diffuser 22 that is adapted to transmit the light emitted from the light emission unit 120 is formed on an outer surface of the second plate 14. A connecting member (or connector) 24 is disposed between the heat dissipation plate 20 and the thermal diffuser plate 22 for the thermal conduction between them.

The heat dissipation plate 20 includes a base 201 contacting the first substrate 12 and a plurality of heat dissipation fins 202 arranged on the base 201 and spaced apart from each other. The heat dissipation fins 202 increase the contact area of the heat dissipation plate 20 with the outside air.

The heat dissipation plate 20 may be formed of Al, Ag, Cu, Pt, or any combination thereof.

The heat dissipation plate 20 is connected (or thermally coupled) to a circuit unit (not shown) for supplying electric power to the electron emission unit 110 and the light emission unit 120, so as to dissipate heat generated from the circuit unit.

The thermal diffuser plate 22 transmits (or transfers) the heat generated from the light emission unit 120 to the heat dissipation plate 20. Since the thermal diffuser plate 22 is formed on the outer surface of the second substrate 14 formed on the screen (i.e., light emitting side of the light emission device), the thermal diffuser plate 22 is designed to transmit light. For example, the thermal diffuser plate 22 may be transparent or substantially transparent.

The thermal diffuser plate 22 may be formed of a ceramic material such as aluminum oxide ($Al_2O_3$), titanium oxide ($TiO_2$), or a combination thereof.

The thermal diffuser plate 22 may have a light transmissivity of 80% or more in one embodiment. When the light transmissivity is less than 80% in one embodiment, the light loss increases. In this case, power consumption increases to compensate for the light loss.

The connecting member (or connector) 24 connects (couples or thermally couples) the heat dissipation plate 20 to the thermal diffuser plate 22. The connection member 24 may contact an outer surface of the sealing member 16 or be spaced apart form the sealing member 16. The connecting member 24 may be formed of any material (or materials) that can transmit heat. For example, the connecting member 24 may be formed of a material identical to that of the heat dissipation plate 20 or the thermal diffuser plate 22.

Figure 2:
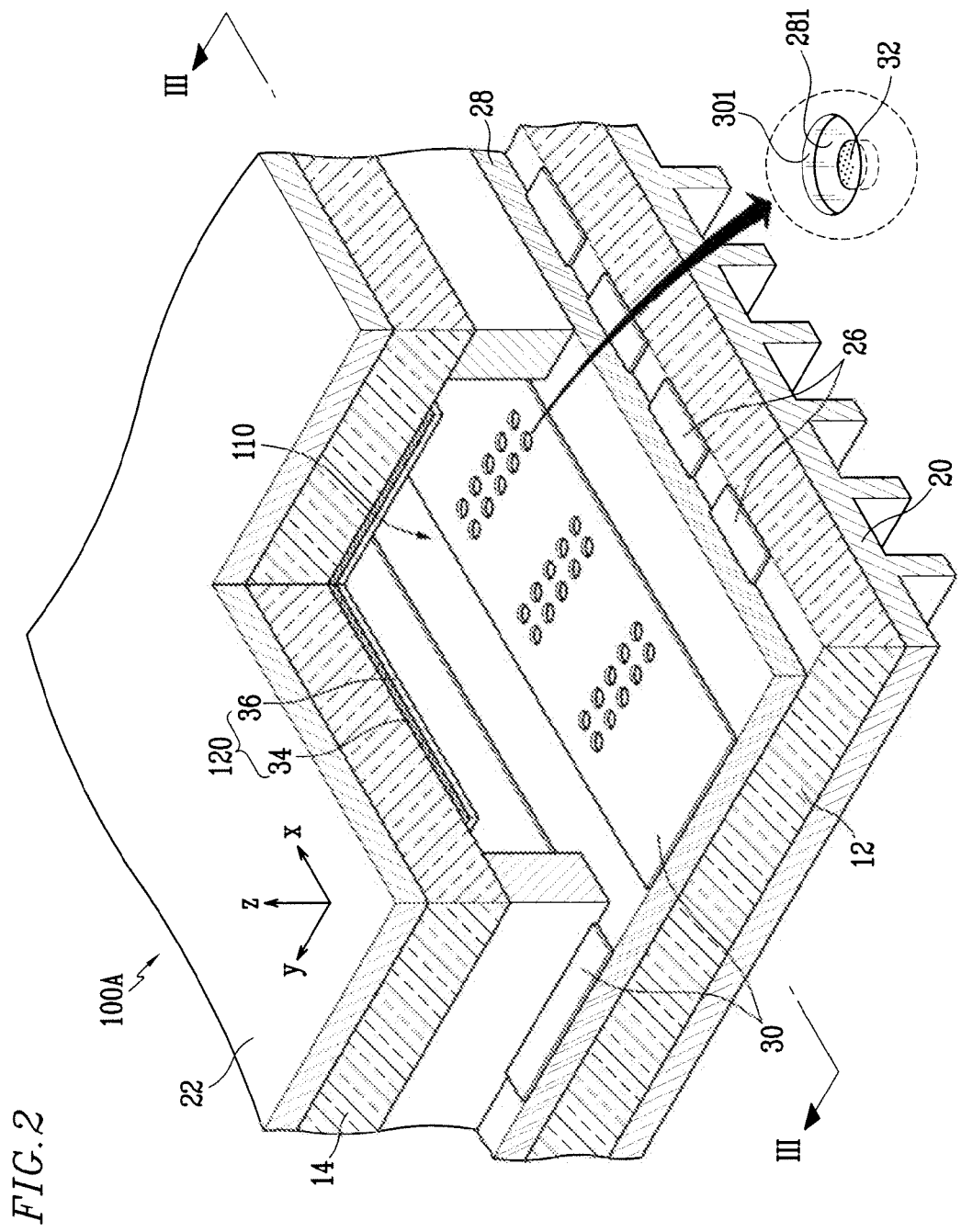
FIG. 2 is a partially broken, exploded perspective view of the light emission device shown in FIG. 1.
Figure 3:
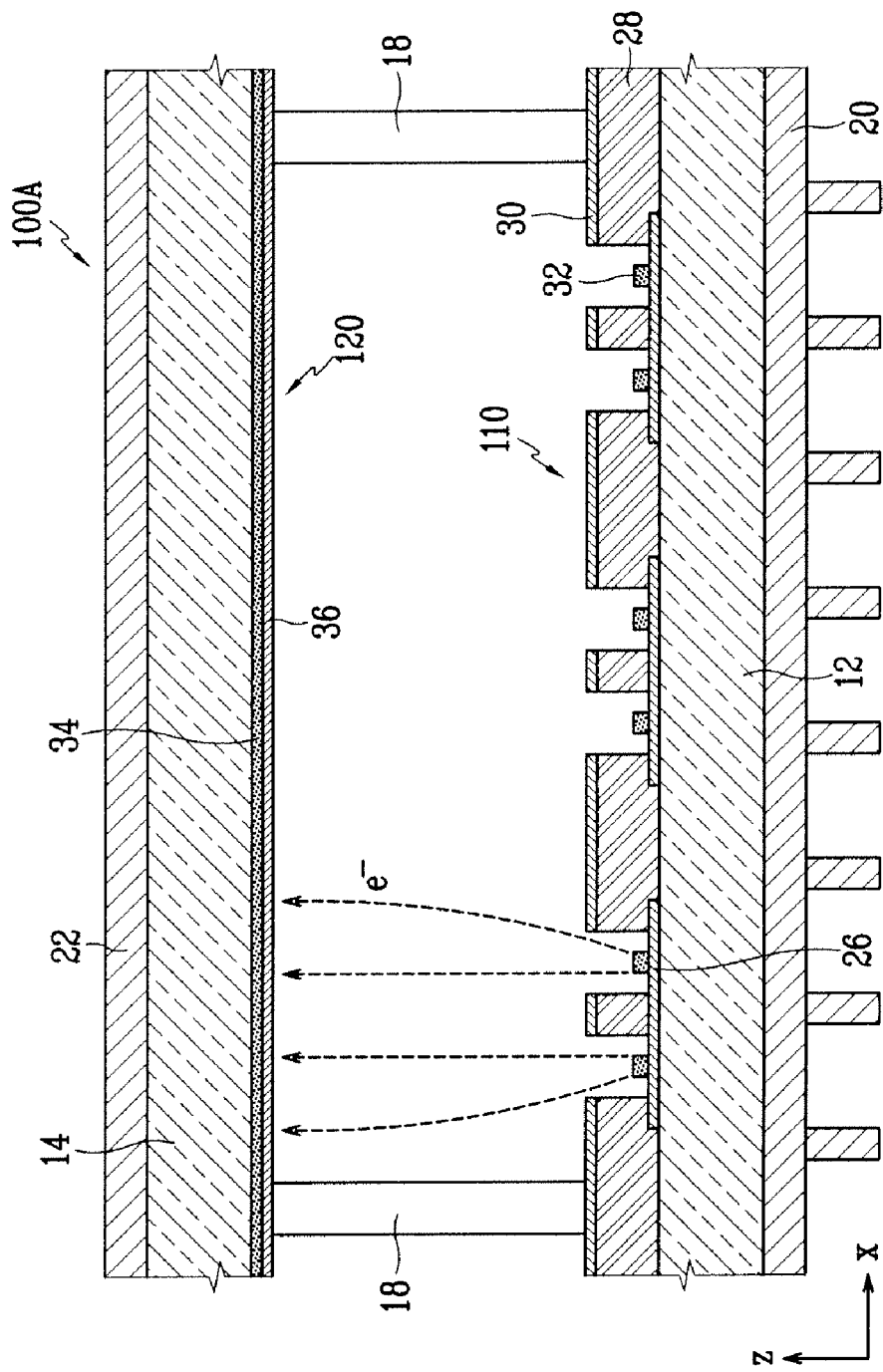
FIG. 3 is a partial sectional view taken along a line III-III of the light emission device shown in FIG. 2.

FIG. 2 is a partially broken, exploded perspective view of the light emission device shown in FIG. 1, and FIG. 3 is a partial sectional view taken along a line III-III of the light emission device shown in FIG. 2.

The light emission device has the electron emission unit 110 having an array of electron emission elements. Generally, the electron emission elements are classified into those using hot cathodes as an electron emission source, and those using cold cathodes as the electron emission source.

There are several types of cold cathode electron emission elements, including Field Emitter Array (FEA) elements, Surface Conduction Emitter (SCE) elements, Metal-Insulator-Metal (MIM) elements, and Metal-Insulator-Semiconductor (MIS) elements.

The light emission device 100A of this embodiment includes an electron emission unit having an array of FEA elements.

Referring to FIGS. 2 and 3, the electron emission unit 110 includes cathode electrodes 26 arranged in a stripe pattern running in a direction (i.e., in a direction of a y-axis in FIG. 2) on the first substrate 12, gate electrodes 30 arranged in a stripe pattern running in a direction (i.e., in a direction of an x-axis in FIG. 2) crossing the cathode electrodes 26 at a right angle, an insulation layer 28 interposed between the cathode electrodes 26 and the gate electrodes 30, and electron emission regions 32 electrically connected to the cathode electrodes 26.

The gate electrodes 30 function as scan electrodes for receiving scan signals while the cathode electrodes 26 function as data electrodes for receiving data signals.

Openings 281 and 301 corresponding to the respective electron emission regions 32 are formed through the insulation layer 28 and the gate electrodes 30, respectively, at crossing areas of the cathode and gate electrodes 26 and 30 to expose the electron emission regions 32.

One crossing area of the cathode and gate electrodes 26 and 30 may correspond to one pixel area of the light emission device. Alternatively, two or more crossing areas of the cathode and gate electrodes 26 and 30 may correspond to one pixel area of the light emission device. In this case, according to one embodiment, two or more first electrodes 26 and/or two or more gate electrodes 30 that correspond to one pixel area are electrically connected to each other to receive a common driving voltage.

The electron emission regions 32 are formed of a material that emits electrons when an electric field is applied thereto under a vacuum atmosphere, such as a carbon-based material or a nanometer-sized material. For example, the electron emission regions 32 can be formed of carbon nanotubes, graphite, graphite nanofibers, diamonds, diamond-like carbon, $C_{60}$, silicon nanowires or a combination thereof. The electron emission regions 32 can be formed, for example, through a screen-printing process, a direct growth, a chemical vapor deposition, or a sputtering process.

Alternatively, the electron emission regions can be formed to have a tip structure formed of a Mo-based or Si-based material.

The light emission unit 120 includes a plurality of phosphor layers 34 and an anode electrode 36. The phosphor layers 34 may be white phosphor layers or a combination of red, green and blue phosphor layers. The former is shown in FIG. 2, for example.

The white phosphor layer may be formed on an entire surface of the second substrate 14 or formed in a pattern (e.g., a predetermined pattern) having a plurality of sections each corresponding to one pixel area. The red, green and blue phosphor layers, for example, may be formed in a predetermined pattern in one pixel area.

The anode electrode 36 covers the phosphor layers 34, an may be formed of metal such as Al. The anode electrode 36 is an acceleration electrode that receives a high voltage to maintain the phosphor layer 34 at a high electric potential state. The anode electrode 36 functions to enhance the brightness by reflecting the visible light, which is emitted from the phosphor layers 34 toward the first substrate 12, to the second substrate 14.

When driving voltages are applied to the cathode and gate electrodes 26 and 30, an electric field is formed around the electron emission regions 32 at pixel areas where a voltage difference between the cathode and gate electrodes 26 and 30 is higher than a threshold value, thereby emitting electrons from the electron emission regions 32. The emitted electrons are accelerated by the high voltage applied to the anode electrode 36 to collide with the corresponding phosphor layer 34, thereby exciting the phosphor layer 34. A light emission intensity of the phosphor layer 34 at each pixel corresponds to an electron emission amount of the corresponding pixel.

In the above-described driving process, heat generated from the electron emission unit 110 is directly dissipated through the first substrate 12 and the heat dissipation plate 20. Heat generated from the light emission unit 120 is dissipated through the second substrate 14, the thermal diffuser plate 22, the connecting member 24, and the heat dissipation plate 20.

Figure 4:
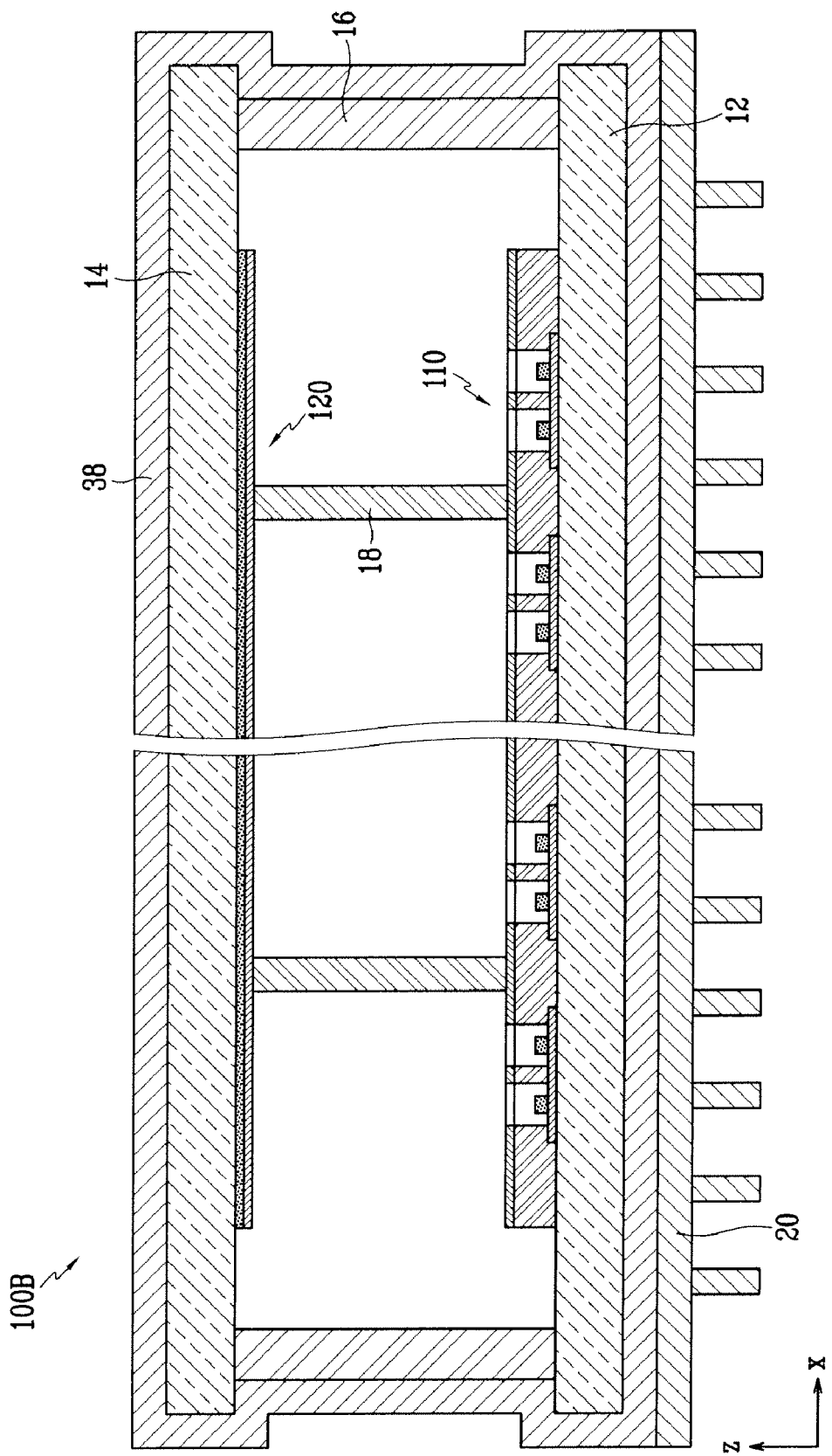
FIG. 4 is a sectional view of a light emission device according to another embodiment of the present invention.

FIG. 4 is a sectional view of a light emission device according to another embodiment of the present invention. In this embodiment, parts identical to those of the foregoing embodiment are assigned with like reference numerals.

Referring to FIG. 4, a light emission device 100B includes a thermal diffuser plate 38 that is continuously formed on an entire outer surface of the vacuum envelope. That is, the thermal diffuser plate 38 is formed on the first and second substrates 12 and 14 and the sealing member 16. The heat dissipation plate 20 is formed on an outer surface of the thermal diffuser plate 38 at the first substrate 12. According to this embodiment, the heat dissipation plate 20 directly contacts (or is directly connected to) the thermal diffuser plate 38 without using any connecting member (or connector). In this case, the light emission device manufacturing process can be simplified.

The light emission devices 100A and 100B of the foregoing embodiments can be used as a backlight unit for a liquid crystal display.

Figure 5:
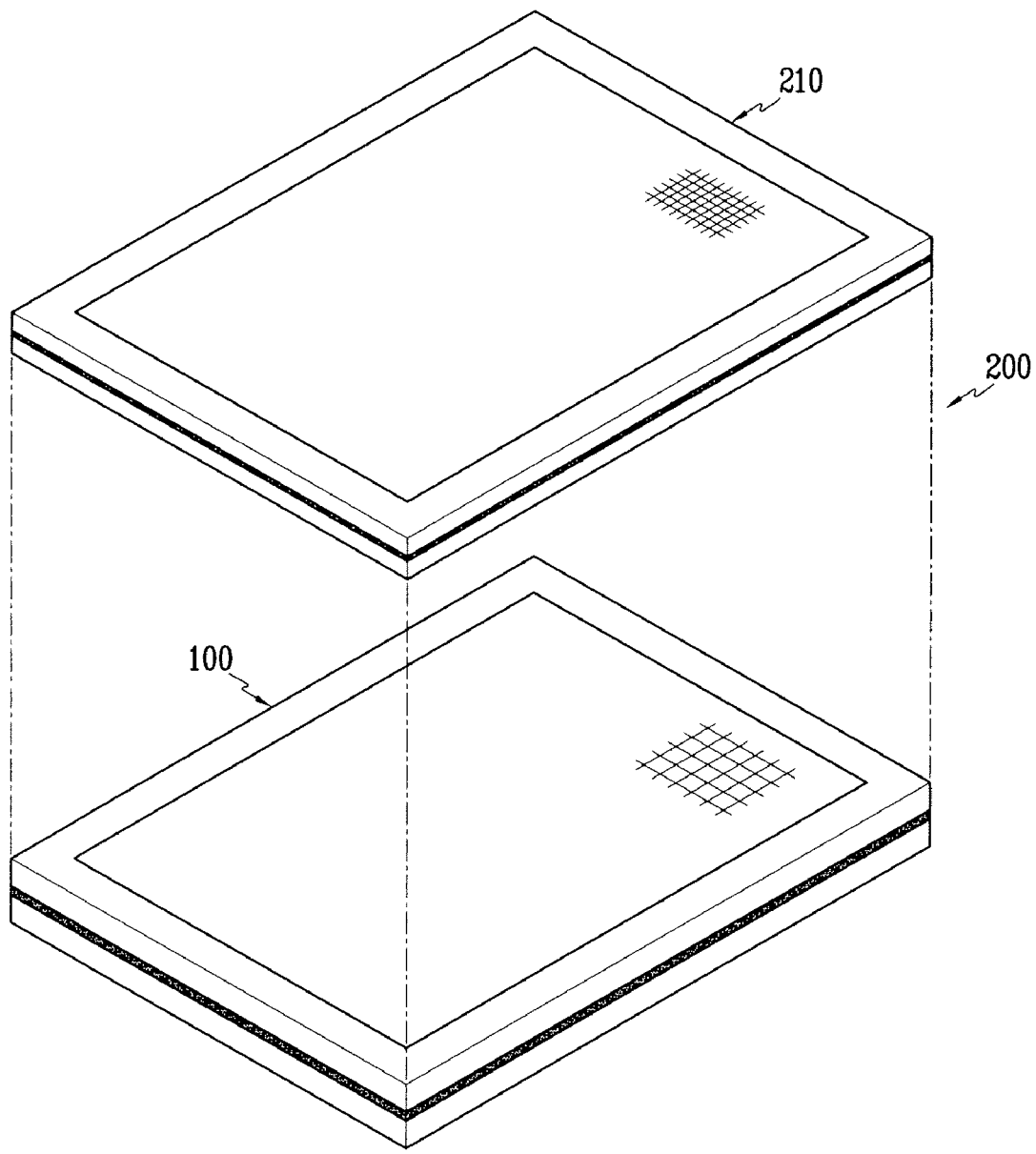
FIG. 5 is a liquid crystal display using a light emission device as a backlight according to an embodiment of the present invention.
Figure 6:
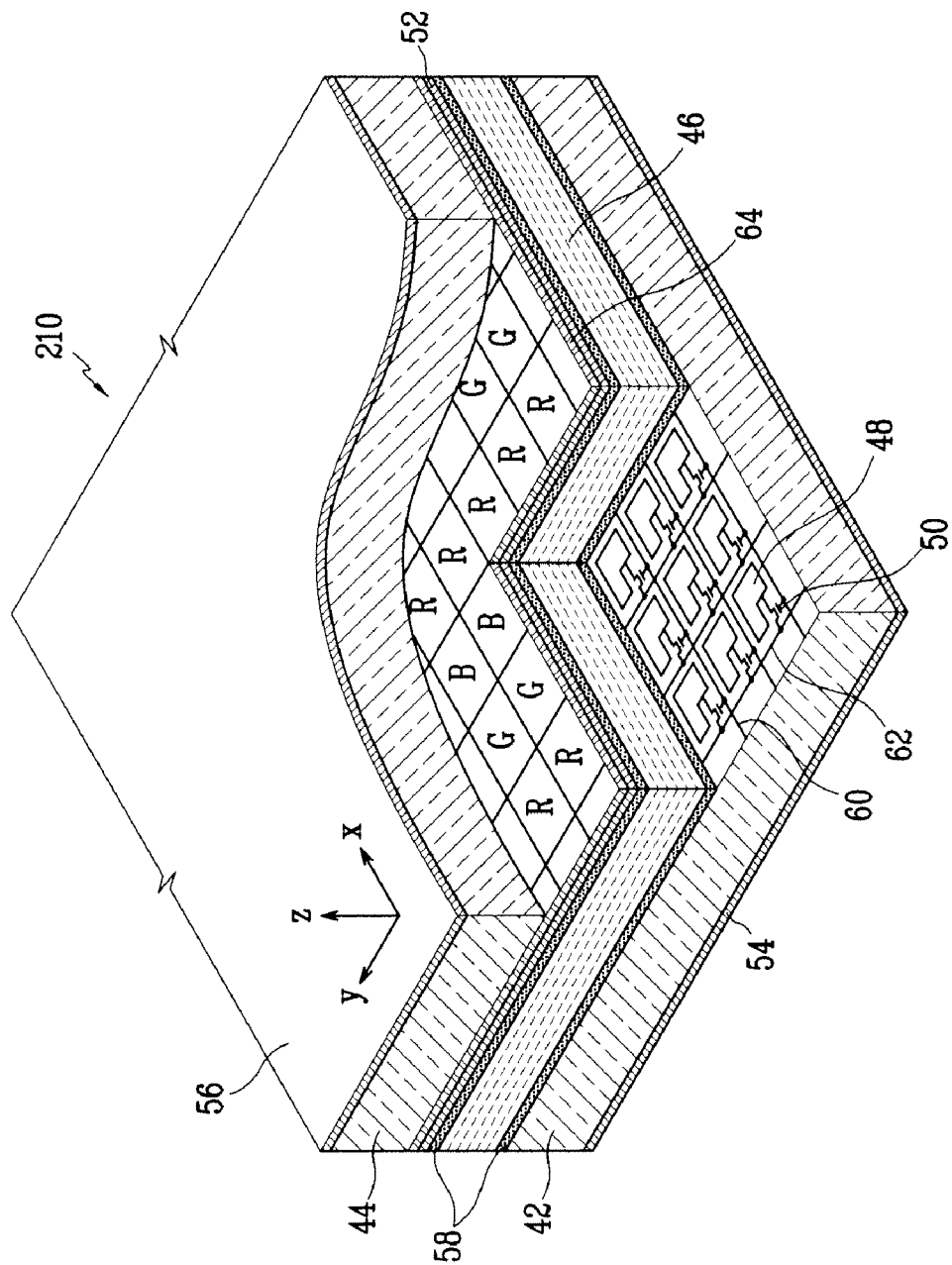
FIG. 6 is a partially broken, perspective view of a liquid crystal panel assembly shown in FIG. 5.

FIGS. 5 and 6 show a liquid crystal display according to an embodiment of the present invention.

Referring to FIG. 5, a liquid crystal display 200 of this embodiment includes a liquid crystal (LC) panel assembly 210 having a plurality of pixels arranged in rows and columns and a light emission device (backlight unit) 100 for emitting light toward the liquid crystal panel assembly 210. The light emission device 100 can be the light emission device 100A of FIG. 1 or the light emission device 100B of FIG. 4.

In one embodiment, the number of pixels of the light emission device 100 is less than that of the liquid crystal panel assembly 210 so that one pixel of the light emission device 100 corresponds to two or more pixels of the liquid crystal panel assembly 210.

The rows are defined in a horizontal direction (i.e., a direction of an x-axis in FIG. 6) of a liquid crystal display region (e.g., a screen or display area of the liquid crystal panel assembly 52). The columns are defined in a vertical direction (i.e., a direction of a y-axis in FIG. 6) of the liquid crystal display region (e.g., the screen of the liquid crystal panel assembly 52).

In one embodiment, the cathode electrodes 26 of the light emission device are arranged along a column direction (i.e., direction of the columns) and the gate electrodes 30 of the light emission device 100 (100A or 100B) are arranged along a row direction (i.e., a direction of the rows).

When the number of pixels arranged along a line of the liquid crystal panel assembly 210 is M and the number of pixels arranged along a column of the liquid crystal panel assembly 210 is N, the resolution of the liquid crystal panel assembly 210 can be represented as M×N. When the number of pixels arranged along a line of the backlight unit (light emission device) 100 is M' and the number of pixels arranged along a column of the light emission device 100 is N', the resolution of the light emission device 100 can be represented as M'×N'.

In this embodiment, the number of pixels M can be defined as a positive number greater than or equal to 240 and the number of pixels N can be defined as a positive number greater than or equal to 240. The number of pixels M' can be defined as one of the positive numbers ranging from 2 to 99, and the number of pixels N' can be defined as one of the positive numbers ranging from 2 to 99.

The pixels of the light emission device 100 provide different intensities of light to the corresponding pixels of the liquid crystal panel assembly 210, thereby enhancing the dynamic contrast of the screen.

Referring to FIG. 6, the liquid crystal panel assembly 210 includes third and fourth substrates 42 and 44 facing each other and a liquid crystal layer 46 disposed between the third and fourth substrates 42 and 44. Pixel electrodes 48 and switching elements 50 are formed on an inner surface of the third substrate 42 and a common electrode 52 is formed on an inner surface of the fourth substrate 44.

A pair of polarizers 54 and 56 are respectively disposed on outer surfaces of the third and fourth substrates 42 and 44. Orientation layers 58 are disposed to face each other with the liquid crystal layer 46 interposed therebetween.

A plurality of gate lines 60 for transmitting gate signals and data lines 62 for transmitting data signals are formed on the inner surface of the third substrate 42. The gate lines 60 are arranged in parallel with each other along the rows, and the data lines 62 are arranged in parallel with each other along the columns.

The pixel electrodes 48 are formed, such that each pixel electrode corresponds to one sub-pixel. The pixel electrodes 48 are connected to the gate lines 60 and the data lines 62 through the respective switching elements 50.

A color filter 64 is disposed between the fourth substrate 44 and the common electrode 52. The color filter 64 includes red, green and blue filters, each sub-pixel corresponding to one of the red, green or blue filter. Three sub-pixels where the red, green and blue filters are arranged define one pixel.

When the switching elements 50 are turned on, an electric field is formed between the pixel electrodes 48 and the common electrode 52 to change twisting angles of the liquid crystal molecules of the liquid crystal layer 46. By controlling the twisting angle of each sub-pixel, an amount of the light transmission is controlled to realize a color image (e.g., a predetermined color image).

Figure 7:
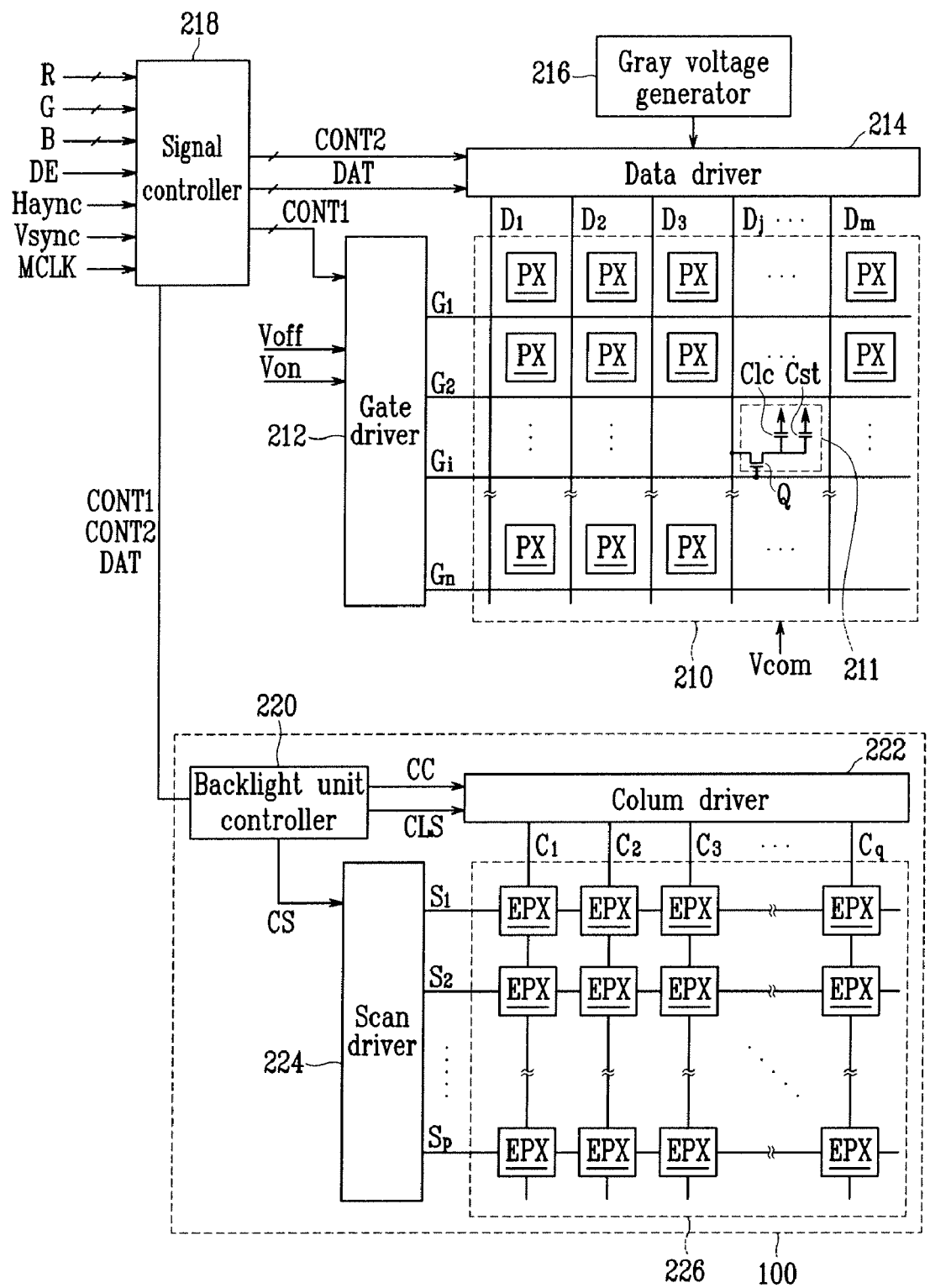
FIG. 7 is a block diagram of a driving part for driving the liquid crystal display of FIG. 6.

FIG. 7 is a block diagram of a driving part of the liquid crystal display according to an embodiment of the present invention.

Referring to FIG. 7, the driving part of the liquid crystal display includes gate and data drivers 212 and 214 connected to the liquid crystal panel assembly 210, a gray voltage generator 216 connected to the data driver 214, and a signal controller 218 for controlling the drivers as well as the light emission device 100.

When the liquid crystal panel assembly 210 is viewed as an equivalent circuit, the liquid crystal panel assembly 210 includes a plurality of signal lines and a plurality of pixels PX arranged in rows and columns and connected to the signal lines. The signal lines include a plurality of gate lines $G_1$-$G_n$ for transmitting gate signals (or scan signals) and a plurality of data lines $D_1$-$D_m$ for transmitting data signals.

Each pixel, e.g., a pixel 54 connected to an $i_{th}$ (i=1, 2, ... n) gate line $G_i$ and a $j_{th}$ (j=1, 2, ... m) data line $D_j$, includes a switching element Q connected to the $i_{th}$ gate line $G_i$ and the $j_{th}$ data line $D_j$, and liquid crystal and sustain capacitors Clc and Cst. In another embodiment, the sustain capacitor Cst may be omitted.

The switching element Q is a 3-terminal element such as a thin film transistor formed on a lower substrate (shown in FIG. 6) of the liquid crystal panel assembly 210. That is, the switching element Q includes a control terminal connected to the gate line $G_i$, an input terminal connected to the data line $D_j$, and an output terminal connected to the liquid crystal and sustain capacitors Clc and Cst.

In one embodiment, the gray voltage generator 216 generates two sets of gray voltages (or two sets of reference gray voltages) related to the transmissivity of the first pixels PX. One of the two sets has a positive value with respect to a common voltage Vcom and the other has a negative value.

The gate driver 212 is connected to the gate lines G1-Gn of the liquid crystal panel assembly 210 to apply a scan signal that is a combination of a gate-on-voltage Von and a gate-off-voltage Voff to the gate lines $G_1$-$G_n$.

The data driver 214 is connected to the data lines $D_i$-$D_m$ of the liquid crystal panel assembly 210. The data driver 214 selects a gray voltage from the gray voltage generator 216 and applies the selected gray voltage to the data lines $D_1$-$D_m$. However, when the gray voltage generator 216 does not provide all of the voltages for all of the grays but provides only a number (e.g., a predetermined number) of reference gray voltages, the data driver 214 divides the reference gray voltages, generates the gray voltages for all of the grays, and selects a data signal from the gray voltages.

The signal controller 218 controls the gate driver 212, the data driver 214 and the backlight unit controller 220. The signal controller 218 receives input image signals R, G and B and an input control signal for controlling the display of the image from an external graphic controller (not shown).

The input image signals R, G and B have luminance information of each pixel PX. The luminance has a number (e.g., a predetermined number) of grays (e.g., 1024 or 256 gray levels in the gray scale). The input control signal may include one or more of a vertical synchronizing signal Vsync, a horizontal synchronizing signal Hsync, a main clock signal MCLK, or a data enable signal DE.

The signal controller 218 properly processes the input image signals R, G and B in response to the operating condition of the liquid crystal panel assembly 210 with reference to the input control signal and generates a gate control signal CONT1 and a data control signal CONT2. The signal controller 218 transmits the gate control signal CONT1 to the gate driver 212. The signal controller 218 transmits the data control signal CONT2 and the processed image signal DAT to the data driver 214. The signal controller 218 further transmits the gate control signal CONT1, the data control signal CONT2, and the processed image signal DAT to the backlight unit controller 220.

The light emission device 100 includes a backlight unit controller 220, a column driver 222, a scan driver 224, and a display unit 226.

The display unit 226 of the light emission device 100 includes a plurality of scan lines $S_1$-$S_p$ for transmitting scan signals, a plurality of column lines $C_1$-$C_q$, and a plurality of light emission pixel EPX. Each light emission pixel EPX is disposed at a crossing area between the scan lines $S_1$-$S_p$ and the column lines $C_1$-$C_q$. The scan lines $S_1$-$S_p$ are connected to the scan driver 224 and the column lines $C_1$-$C_q$ are connected to the column driver 222. The scan and column drivers 224 and 222 are connected to the backlight unit controller 220 to operate in response to the control signal from the backlight unit controller 220.

In one embodiment, the scan lines $S_1$-$S_p$ correspond to the scan electrodes of the light emission device and the column lines $C_1$-$C_q$ correspond to the data electrodes of the light emission device.

The backlight unit controller 220 generates a scan driver control signal CS for controlling the scan driver 224 using the gate control signal CONT1. The scan driver control signal CS is transmitted to the scan driver 224. The backlight unit controller 220 generates a column driver control signal CC using the data control signal CONT2. The backlight unit controller 220 generates a column signal CLS corresponding to the image signal DAT. The column driver control signal CC and the column signal CLS are transmitted to the column driver 222. The backlight unit controller 220 generates luminance information for each pixel of the light emission device 100 from the image signal DAT of one frame. The column signal CLS is generated according to the luminance information.

The scan driver 224 sequentially applies scan signals each having a pulse (e.g., a predetermined pulse) to the scan lines $S_1$-$S_p$ according to the scan driver control signal CS inputted thereto. The column driver 222 receives the column driver control signal CC and the column signal CLS, and applies a driving voltage corresponding to the received column driver control signal CC and the column signal CLS to the column lines $C_1$-$C_q$.

By the above described structure, the display unit 226 of the light emission device 100 receives a driving signal synchronized with an image signal and emits light having a proper intensity according to the luminance information of each pixel. The emitted light is transmitted to the liquid crystal panel assembly 210. In one embodiment, each light emission pixel EPX of the display unit 226 may be driven to represent a gray of 2-8 bits.

Therefore, when the liquid crystal panel assembly 210 displays an image having bright and dark portions, the light emission device 100 provides a light having a relatively high intensity to pixels corresponding to the bright portion and provides a light having a relatively low intensity to pixels corresponding to the dark portion. The pixels of the light emission device 100, which correspond to pixels of the liquid crystal panel assembly 210 for displaying a black color, may be turned off.

As a result, a dynamic contrast of the liquid crystal display may be improved by the above-described process.

The liquid crystal display 200 using the light emission device 100 as a backlight unit has the following features that may be advantageous when compared with a case where a CCFL or LED type backlight unit is used.

Since the light emission device is a surface light source, there is no need to use optical members that were used in the CCFL or LED type backlight unit. Therefore, the light loss that was caused by the optical members can be significantly reduced and thus there is less need or no need to increase the light intensity. As a result, the power consumption can be reduced.

In addition, since no optical member is used in the light emission device of exemplary embodiments according to the present invention, the manufacturing cost can be reduced. The manufacturing cost of the light emission device in exemplary embodiments of the present invention is lower than that of the LED type backlight unit. Furthermore, since a large size light emission device can be easily made, it can be effectively applied to a large-sized liquid crystal display above 30-inch.

Even when the light emission device in exemplary embodiments of the present invention is used as a high luminance device such as the backlight unit, the thermal diffuser plate provided on the first substrate and configured to transmit light, effectively dissipates the heat generated from the light emission unit through the heat dissipation plate without blocking the light and thus the temperature of the second substrate on which the light emission unit is formed can be reduced to be lower than 50° C.

In addition, since the light emission device in exemplary embodiments of the present invention still has the heat dissipation plate that has been conventionally used, there is no need to install additional heat dissipation unit.

Since the dynamic contrast of the liquid crystal display using the light emission device as the backlight unit can be enhanced, the display quality can be improved and the power consumption can be reduced. In addition, the liquid crystal display having a large size can be made more easily.

Although exemplary embodiments of the present invention have been described in detail hereinabove, it should be clearly understood that many variations and/or modifications of the basic inventive concept taught herein still fall within the spirit and scope of the present invention, as defined by the appended claims and their equivalents.

By way of example, while the display device in exemplary embodiments has been described primarily in reference to a liquid crystal display, the invention is not limited thereto. The exemplary embodiments are fully applicable to any display device that uses the light emission device as a light source.

What is claimed is:

1. A light emission device comprising:
a first substrate having a first side and a second side opposite the first side;
a second substrate having a first side and a second side opposite the first side, the first sides of the first and second substrates facing each other;
an electron emission unit located on the first side of the first substrate;

a phosphor layer located on the first side of the second substrate and adapted to be excited by electrons emitted from the electron emission unit;

an anode electrode located on the phosphor layer;

a heat dissipation plate located at the second side of the first substrate; and a thermal diffuser plate located on the second substrate and thermally coupled to the heat dissipation plate, the thermal diffuser plate being configured to transmit light emitted by the phosphor layer.

2. The light emission device of claim 1, wherein the thermal diffuser plate extends to the first substrate; and the heat dissipation plate is located on an outer surface of the thermal diffuser plate at the first substrate.

3. The light emission device of claim 1, wherein the thermal diffuser plate has a light transmissivity of at least 80%.

4. The light emission device of claim 1, wherein the thermal diffuser plate is transparent.

5. The light emission device of claim 1, wherein the thermal diffuser plate is formed of a ceramic material.

6. The light emission device of claim 5, wherein the ceramic material comprises at least one of aluminum oxide or titanium oxide.

7. The light emission device of claim 1, wherein the heat dissipation plate comprises a material selected from the group consisting of Al, Ag, Cu, Au, Pt, and an alloy thereof.

8. The light emission device of claim 1, wherein the heat dissipation plate comprises a base and a plurality of heat dissipation fins located on the base and spaced apart from each other.

9. The light emission device of claim 1, wherein the heat dissipation plate is thermally coupled to a circuit unit to dissipate heat generated from the circuit unit.

10. The light emission device of claim 1, wherein the electron emission unit comprises a cathode electrode and a gate electrode insulated from each other and crossing each other, and electron emission regions electrically connected to the cathode electrode.

11. The light emission device of claim 10, wherein the electron emission regions comprise at least one of a carbon-based material or a nanometer-sized material.

12. The light emission device of claim 1, further comprising a connector disposed between the thermal diffuser plate and the heat dissipation plate to thermally couple the thermal diffuser plate to the heat dissipation plate.

13. The light emission device of claim 12, further comprising a sealer for sealing the first and second substrates together to form a vacuum envelope, wherein the connector contacts the sealer.

14. A display device comprising:

a display panel having a plurality of pixels arranged in rows and columns; and a light emission device disposed behind the display panel and configured to function as a light source for the display device, wherein the light emission device comprises:

a first substrate having a first side and a second side opposite the first side;

a second substrate having a first side and a second side opposite the first side, the first sides of the first and second substrates facing each other;

an electron emission unit located on the first side of the first substrate;

a phosphor layer located on the first side of the second substrate and adapted to be excited by electrons emitted from the electron emission unit;

an anode electrode located on the phosphor layer;

a heat dissipation plate located at the second side of the first substrate; and a thermal diffuser plate located on the second substrate and thermally coupled to the heat dissipation plate, the thermal diffuser plate being configured to transmit light emitted by the phosphor layer.

15. The display device of claim 14, wherein the thermal diffuser plate is formed of a ceramic material.

16. The display device of claim 14, wherein the light emission device has a plurality of pixels arranged in rows and columns, the number of the pixels of the light emission device being less than that of the pixels of the display panel, and the pixels of the light emission device are adapted to emit lights having different light intensities.

17. The display device of claim 16, wherein the light emission device is adapted to represent a gray of 2-8 bits for each of the pixels.

18. The display device of claim 14, wherein the phosphor layer comprises a white phosphor layer.

19. The display device of claim 14, wherein the phosphor layer comprises red, green and blue phosphor layers.

20. The display device of claim 14, wherein the display device is a liquid crystal display, the display panel is a liquid crystal panel assembly, and the light emitting device is configured to operate as a backlight unit for the liquid crystal display.

* * * * *